July 13, 1948.  M. CASERTA  2,445,207
SHAFT SEAL
Filed Nov. 27, 1944

Inventor
MICHELE CASERTA
by
Attys.

Patented July 13, 1948

2,445,207

UNITED STATES PATENT OFFICE 2,445,207

SHAFT SEAL

Michele Caserta, Detroit, Mich.

Application November 27, 1944, Serial No. 565,227

4 Claims. (Cl. 286—11)

This invention relates to a shaft seal, and more particularly to an improved construction of a shaft seal assembly for use in fluid conveying and transferring devices, such as pumps and the like. In my copending applications, Serial Nos. 531,437, filed April 17, 1944, now Patent No. 2,404,690, issued July 23, 1946, and 548,690, filed August 9, 1944, now abandoned, I have described the general construction of a shaft seal to which the present improvements are particularly directed. According to the present invention, I have devised certain improvements in the design and construction of the shaft seal assembly that eliminate objections to previous constructions.

In some of the previous constructions, for instance, trouble has been experienced because of leakage between the seal diaphragm, where the diaphragm was not unitary, and the shaft. Although this difficulty has been overcome by molding the diaphragm in one piece, the improved construction of my present shaft seal assembly makes even more secure the fastening between the diaphragm and the shaft.

The materials now used for diaphragms and gaskets are subject to contraction and expansion according to the fuel used, the amount of aging and the presence or absence of fuel, or other fluid, in or from the vicinity of the diaphragms and gaskets. It has, therefore, appeared necessary to provide a system which would fully compensate for variations in volume of the diaphragm materials. The use of springs would appear to be an obvious solution of the problem, but in the previous designs shown in my above identified pending applications for patent, the reaction of both the springs was taken by the pump rotor. Consequently, if strong springs were used, the strong thrust on the rotor would produce a corresponding increase in friction between the relatively moving bearing surfaces of the shaft seal rings.

In accordance with my present invention, I have devised a clip spring which is easily assembled and disassembled and which not only transmits an axial load to the diaphragm but anchors itself on the shaft without transmitting any thrust load to the pump rotor. Constructions embodying the present invention have been tested with an axial tension on the spring of as much as five pounds, which is sufficient to hold the diaphragm very tightly against the shaft but which adds not at all to the amount of friction between the rotary and stationary sealing rings.

Another objection to previous designs was the fact that the seal springs were not positively located and would sometimes slide sideways and rub on the journal bearing surface. In the present design, one of the springs tightly secures itself in place and the other of the springs is lodged at one end around a retainer for the diaphragm outer periphery and at the other end in a groove in the rotor, so that no misalignment of either of the springs is possible.

Also, in one of my previous shaft seal assemblies, the diaphragm was relied upon to transmit the rotary motion to the rotary seal. In the present construction, means, such as a pin, is provided to transmit the rotary motion of the shaft to the rotary seal while still allowing a relative tilting movement between the rotary seal and the shaft. All strains upon the diaphragm due to inertia are therefore eliminated.

In my present construction, if the shaft wobbles, the rotary seal, being directly pressed by one of the springs previously referred to, will rotate flat at all times against the stationary seal, while at the same time being capable of tiltable movement relative to the shaft, if required to follow the wobbling movement of the shaft. This result is brought out about by the provision of a spherical shoulder on the shaft and a conical bearing surface on the rotary seal for contact with said spherical shoulder. The provision of these relatively tiltable bearing surfaces makes it possible to secure a fluid-tight seal between the planar bearing surfaces of the rotary and stationary seals. While this same result could be obtained by the use of spherical bearing surfaces between the rotary and stationary seals, this would necessitate very accurate manufacture and perfect lapping of the spherical surfaces.

In the present shaft seal construction, the diaphragm takes care of sealing the spherical joints between the shaft and the rotary seal, but if the diaphragm for any reason should become punctured or damaged after a period of operation, even if the spherical seat is not perfect, the leakage is held to a minimum, thereby eliminating all danger from this cause. It may be expected, however, that a diaphragm failure would occur after wobbling action, stress and vibration have worn-in the spherical seats in such a manner as to make them leakproof even if they were not leakproof at the time of assembly, so that no leakage at all should occur even if the diaphragm were to completely disintegrate after this wearing-in action of the spherical seats has taken place.

It is therefore an important object of this invention to provide a shaft seal assembly of improved construction, free from many of the objectionable features of previous designs or constructions of shaft seals and adapted to provide a trouble-free fluid-tight seal between the shaft and the housing through which an end of the shaft extends.

It is a further important object of this invention to provide a shaft seal assembly that includes a construction whereby any wobbling of the shaft is without effect upon the fluid-tightness of the seal or upon the relationship between the bearing surfaces of the rotary and stationary seals.

It is a further important object of this invention to provide a shaft seal assemly of simple yet trouble-free construction and one which, although employing a flexible diaphragm, will continue to give a fluid-tight seal for the shaft even though the diaphragm should fail.

It is a further important object of this invention to provide a shaft seal assembly including a novel and improved construction of spring for anchoring at one end onto the shaft itself with the other end of the spring constantly urging the diaphragm into fluid-sealing relationship with the shaft, whereby a relatively heavy spring can be used if desired without in any way increasing the frictional resistance between the rotary and stationary seals.

Other and further important objects of this invention will be apparent from the disclosures in the specification and the accompanying drawings.

Figure 1:
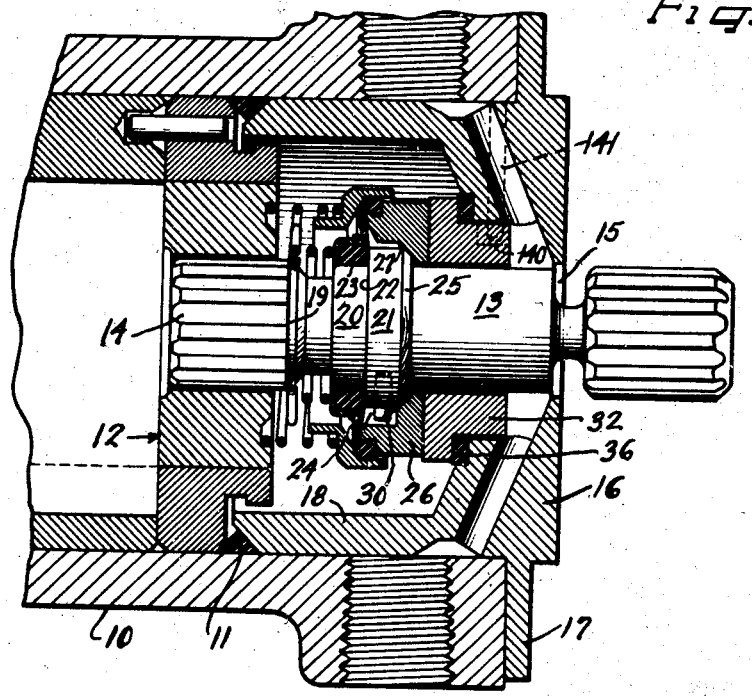
Figure 1 is a fragmentary sectional view of a fluid transfer mechanism, such as a fuel pump of the sliding vane type, illustrating the improved shaft seal assembly of my invention.

The reference numeral 10 indicates generally a pump housing, having a bore 11 open at one end thereof. A pump rotor, indicated generally by the reference numeral 12 is mounted in said bore and is driven by a shaft 13 through a spline connection 14. The other end of said shaft 13 extends freely through an opening 15 in a gland 16. Said gland 16 is provided with a flange 17 for attachment to the pump housing 10 and is further provided with an inwardly extending cylindrical portion 18 fitting within said housing bore 11.

All of the features of construction thus far described generally are old in the fuel transfer mechanism structure illustrated in my Patent No. 2,353,545, dated July 11, 1944. While the present invention is illustrated and described in connection with the pumping mechanism of that patent, it will be understood that my present invention has wide applicability to other types and constructions of fluid transfer mechanisms.

The shaft 13, in passing through the gland 16, must be allowed to wobble because of possible eccentricities in both the male and female splines at each end of the shaft. At the same time, the liquid being pumped, which in the type of device here illustrated is usually aviation gasoline, is under considerable pressure on the left hand side of the gland 16 (Fig. 1) and means must be provided to prevent leakage of such fuel along the shaft 13 and through the gland opening 15.

Figure 3:
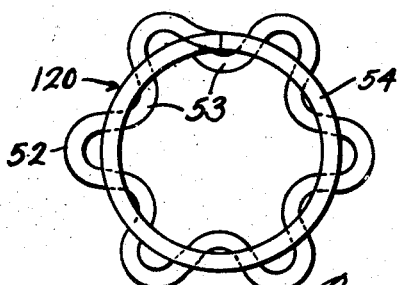
Figure 3 is an end elevational view of a clip spring of my invention for use in a shaft seal assembly such as illustrated in Figures 1 and 2.

According to the present invention the shaft 13 is formed with a number of integral shoulders and grooves. Adjacent the inner splined end 14 is a groove 19 for anchoring a clip spring indicated generally by the reference numeral 120 (Fig. 3) which will later be described in detail. Outwardly beyond the groove 19 there are two integral cylindrical portions of the shaft, namely, the shaft portion 20 and the enlarged annular shaft portion 21, between which is formed a plane, annular shoulder 22. The inner periphery 23 of a diaphragm 24 snugly fits about said shaft portion 20 to abut the shoulder 22, as will be more fully described hereinafter.

Figure 2:
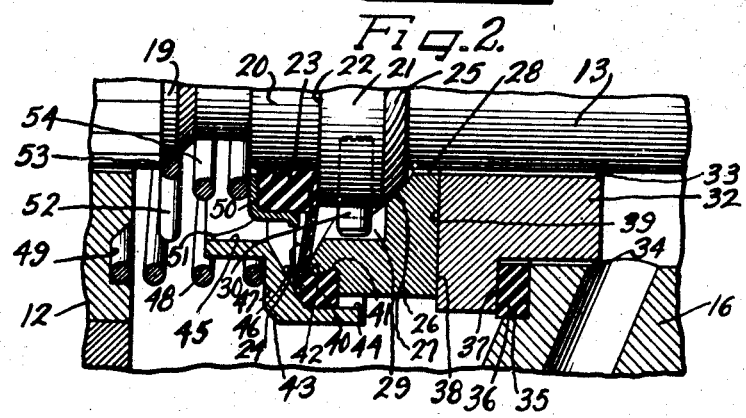
Figure 2 is an enlarged detail view of Figure 1.

The outwardly facing surface of the enlarged annular shaft portion 21 is segmental spherical, as at 25, to constitute what is hereinafter termed a spherical bearing surface. A rotary seal 26 surrounds the shaft 13 adjacent the enlarged annular portion 21 and is provided with a conical bearing surface 27 for contact with said spherical bearing surface 25. Since the rotary seal 26 is provided with a bore 28 (Fig. 2) of larger diameter than the external diameter of the shaft 13, said rotary seal is capable, by reason of the spherical bearing surface 25 and conical bearing surface 27 of limited tilting movement relative to said shaft 13. In order to positively drive the rotary seal 26 from the shaft 13, the rotary seal 26 is provided with the recess 29, into which extends one end of a pin 30, the other end of said pin extending into said shaft 13 and being secured therein. The extended end of the pin 30 thus forms a driving connection between the shaft 13 and rotary seal 26 but at the same time permits the limited tilting movement previously referred to in the event the shaft 13 wobbles about its own axis.

A stationary seal 32 is positioned about the shaft 13 outwardly of said rotary seal 26, with clearance between said shaft 13 and the bore 33 of said stationary seal. The outer cylindrical end of said stationary seal 32 extends into the end opening of the gland 16 but with clearance therebetween, as at 34. Said gland at the inner end of the opening therethrough is provided with an annular recess 35 into which is positioned a resilient packing ring 36. The inner enlarged end 37 of said stationary seal 32 is adapted to be pressed against the inner face of said resilient packing ring 36, as will later be more fully explained.

The rotary seal 26, which may suitably be formed of bronze, is provided with a planar bearing surface 38 which normally lies in a plane transverse to the axis of said shaft 13. The stationary seal 32 is likewise provided with a planar bearing surface 39, for bearing and sealing contact with said bearing surface 38. The two surfaces 38 and 39 are preferably lapped so as to give a fluid-tight seal therebetween. The stationary seal 32 may be suitably formed of steel. In order to prevent said stationary seal 32 from turning movement, said seal is provided with a recess, 140, into which extends one end of a pin 141 that projects through the gland 16, as shown in dotted lines in Figure 1.

The diaphragm 24, which has already been referred to, is of the construction described and claimed in my application Serial No. 548,690, now abandoned. Said diaphragm comprises an integral annular member having enlarged inner and outer peripheries joined by an intermediate flexible web portion. Such a diaphragm is preferably made by a molding operation, the mold being first loaded with a cloth disk of rubberized nylon fabric, cotton fabric or the like, against which is placed an unvulcanized synthetic rubber composition preferably partly in the form of rings so arranged as to provide the material for the inner and outer peripheries, or gasket-like portions. The synthetic rubber composition on the fabric and that added in the mold are similar and preferably identical so that no cement is necessary and so that by curing, a solid molded piece is obtained. The web portion is preferably sufficiently thinner than either of the peripheral portions to give the required amount of resiliency. A rubber composition found most satisfactory is an aromatic-resistant composition of the Buna type.

The outer peripheral, or gasket-like portion 40 of said diaphragm is adapted to be received in an annular groove or recess 41 formed in the rotary seal 26. Said groove or recess 41 is preferably provided with an overhanging lip portion 42 the better to secure the outer gasket-like portion 40 of the diaphragm in place in said groove or recess 41.

A retainer ring 43 is adapted to partially enclose the outer gasket-like portion 40 of said diaphragm 24. Said retainer ring 43, in addition to the larger cup-like portion 44 referred to as enclosing the outer periphery of the diaphragm, has an oppositely extending annular portion 45 of lesser diameter. The intermediate portion joining said annular portions 44 and 45 is of somewhat heavier construction and provides a tapered inner surface 46 adapted to be pressed against said outer gasket-like portion 40 of the diaphragm. Said intermediate portion of the retainer ring 43 also provides an outside shoulder 47 against which is pressed one end of a helical spring 48. The other end of said spring 48 is adapted to be received in an annular groove 49 formed in the endwall of the rotor 12. The ends of said helical spring 48 are, of course, squared, although they need not be ground. The diameter of the spring 48 is such as to receive the flange 45 of the retainer ring 43, which thereby forms a guide for said spring.

The inner periphery, or gasket-like portion 50 of said diaphragm 24 is, as previously stated, snugly fitted about the annular shaft portion 20 against the shoulder 22. A retainer ring 51 of angular cross section (Fig. 2) partially encloses the inner gasket-like portion 50. The clip spring 120, which will now be described in detail, bears at its one end against said retainer ring 51 to hold said gasket-like portion 50 in fluid-tight sealing relation to said annular shaft portion 20 and shoulder 22.

The clip spring 120 comprises an integral length of heavy wire of circular cross section, one end of which is formed in a plurality of radially extending loops 52, all lying in the same plane. Said end including the loops 52 is squared to fit squarely against the shoulder provided by the groove 19. The inside portions 53 of said loops 52 normally define a diameter slightly less than that of the bottom of the groove 19, so that said looped ends can be sprung into said groove 19 to be retained therein and thus anchored on the shaft 13. The remaining portion of the clip spring 120 comprises helically arranged turns 54, the end turn of which presses against the retainer ring 51 to cause the inner gasket-like portion 50 of said diaphragm 23 to be held in fluid-tight contact with said shaft 13, as previously explained.

As is apparent, the clip spring 120 being anchored at one end in the shaft groove 19 does not in any way increase the amount of friction between said bearing surfaces 38 and 39 of the rotary seal 26 and stationary seal 32, respectively, as would be the case if the spring 120 were compressed between the rotor and the retainer ring 51. The spring 48, which is compressed between the rotor 12 and retainer ring 43, is less heavily loaded so as to insure only sufficient pressure between said bearing surfaces 38 and 39 to maintain them in fluid-tight relationship.

It may be noted that in the construction above described, if the shaft 13 should be pressed inwardly toward the pump for any reason, such as because of dirt or wear in the female spline of the engine drive, the seal is not broken, since the spring 48 continues to press the rotary seal 26 against the stationary seal 32. The diaphragm 24 is preferably made with enough slack so that there is no chance of pulling the rotary seal away from the stationary seal when the shaft 13 is so pressed in.

Even before installation on the engine, a construction such as described has the advantage that the finely lapped seal surfaces 38 and 39 cannot be separated by manipulation of the shaft. There is, therefore, no chance of foreign matter falling between such surfaces before installation.

Should the shaft be pressed in while the pump is installed and in operation and while fuel pressure is present on the pump side of the seal, the pressure, which corresponds to the effective area of the shaft itself and of part of the diaphragm, is relieved from the seal because the shaft is held away from the spherical seat 25. The rotary seal, however, will still be pressed against the stationary seal by the pressure effected on the outer zone of the diaphragm 23 and by the pressure of the spring 48.

Should the mean effective diameter of the ring-like seal zone between the rotary seal 26 and the stationary seal 32 be very small, as could be obtained by relieving the outer zone of the stationary seal 32 to lessen the area of the bearing surface 39 in contact with the rotary seal 26, fuel pressure would tend to unseat the surfaces 38 and 39. This unseating action would be opposed by the pressure on the opposite, or left hand side as viewed in the drawings, of the diaphragm 24 and of the spring 48. By varying the mean effective diameter of the seal, the slack of the diaphragm and the tension of the spring 48, the result could be obtained that the seal would not become unseated even if the shaft 13 were pushed in, at least for any fuel pressure that can be foreseen. If the mean effective seal ring diameter is larger than the diaphragm 24, the seal will not open under any pressure even with the shaft pushed in and even with the tension of the spring 48 reduced to zero.

It will thus be appreciated that with the construction described, proportional dimensions of the several elements and strength of springs can be so selected as to insure effective sealing for any conditions of operation that might arise in the fluid transfer system. Furthermore, the shaft seal of my invention has a double sealing feature in that should the diaphragm fail, the spherical seal between the surfaces 25 and 27, at least after the pump has been operating for some little time, would prevent leakage along the shaft 13 in combination with the seal provided by the bearing surfaces 38 and 39. This is a very important feature in airplane fuel pumps, where failure of a pump might result in the loss of lives.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a shaft seal assembly including a shaft having an annular groove, a sealing ring rotatable with said shaft and a diaphragm between said rotary sealing ring and said shaft, a spring having inwardly looped portions normally of lesser diameter than said groove so as to be sprung into said groove and thereby be anchored on said shaft and having a helical portion extending against and constantly urging said diaphragm into sealing engagement with said shaft.

2. In a shaft seal assembly including a shouldered and annularly grooved shaft, a sealing ring engaging with a shoulder of said shaft and rotatable with said shaft and a diaphragm between said rotary sealing ring and said shaft, a spring having inwardly looped portions normally of lesser diameter than the groove in said shaft so as to be sprung into said groove and thereby be anchored on said shaft and having a helical portion extending against and constantly urging said diaphragm into sealing engagement with said shaft shoulder.

3. In a shaft seal assembly for a pump including a shaft, a rotor driven thereby, a stationary seal, a rotary seal in sealing engagement with said stationary seal, and a diaphragm sealing said shaft and rotary seal, the improvement which comprises resilient means having expansible and contractible loop portions snap-anchored to said shaft and having other portions constantly urging the inner periphery of said diaphragm against said shaft, a second resilient means seated at one end against said rotor with the other end constantly urging the outer periphery of said diaphragm against said rotary seal, and means extending between said shaft and rotary seal to insure positive rotation of said rotary seal with said shaft independently of the drive from said shaft to said rotary seal through said diaphragm.

4. In a shaft seal assembly for a pump including a shaft, a rotor driven thereby, a stationary seal, a rotary seal in sealing engagement with said stationary seal, and a diaphragm sealing said shaft and rotary seal, the improvement which comprises resilient means having expansible and contractible loop portions snap-anchored to said shaft and having other portions constantly urging the inner periphery of said diaphragm against said shaft and a second resilient means seated at one end against said rotor with the other end constantly urging the outer periphery of said diaphragm against said rotary seal, said shaft having a shoulder for anchoring said first mentioned resilient means, a second shoulder for receiving thereagainst the inner periphery of said diaphragm and a third segmental spherical shoulder providing a seat for said rotary seal to permit tilting movement thereof with respect to said shaft.

MICHELE CASERTA.

REFERENCES CITED

The following references are of record in the file of this patent:

UNITED STATES PATENTS

| Number | Name | Date |
| --- | --- | --- |
| 2,023,898 | Olson | Dec. 10, 1935 |
| 2,080,403 | Homan | May 18, 1937 |
| 2,294,387 | Curtis et al. | Sept. 1, 1942 |
| 2,373,463 | Curtis | Apr. 10, 1945 |
| 2,379,868 | Curtis | July 10, 1945 |
| 2,380,222 | Curtis et al. | July 10, 1945 |